United States Patent [19]
Matthews, Jr.

[11] 3,777,499
[45] Dec. 11, 1973

[54] OFFSHORE PIPELINE RECOVERY

[75] Inventor: Jamie F. Matthews, Jr., Houston, Tex.

[73] Assignee: Esso Production Research Company, Houston, Tex.

[22] Filed: June 14, 1972

[21] Appl. No.: 262,815

[52] U.S. Cl. .................................. 61/72.3, 114/50
[51] Int. Cl. ........................... B63c 7/12, F16l 1/00
[58] Field of Search .................. 61/72.3, 72.1, 72.4; 114/50, 51; 285/18

[56] References Cited
UNITED STATES PATENTS
2,602,300  7/1952  Collins ............................... 61/72.4
2,363,488  11/1944  Bartlett ............................... 114/50
3,631,830  1/1972  Welch ................................ 114/50
3,525,226  8/1970  McCarron ........................... 61/72.3

Primary Examiner—Jacob Shapiro
Attorney—James A. Reilly et al.

[57] ABSTRACT

An offshore pipeline is recovered from the bottom of a body of water by introducing gas into one end of the line and pumping liquids from the other end of the pipeline until a section of the line at least sufficiently long to reach to the surface of the body of water has been substantially voided of liquids, and thereafter lifting the end of the pipeline to the water's surface. This procedure substantially reduces the cost of pipeline recovery operations and has other advantages over methods used in the past.

20 Claims, 4 Drawing Figures

PATENTED DEC 11 1973 3,777,499

OFFSHORE PIPELINE RECOVERY

BACKGROUND OF THE INVENTION

1. Field of the Invention

This invention relates to the recovery of offshore pipelines and is particularly concerned with a method for recovering the end of a damaged line from the bottom of a body of water.

2. Description of the Prior Art

Offshore pipelaying operations are generally carried out by means of a laybarge or similar vessel which moves along the pipeline route. As the pipe is lowered into place from the stern of the moving vessel, it bends under its own weight and assumes a generally S-shaped configuration between the vessel and the bottom of the body of water. The amount of bending which takes place depends upon the weight and dimensions of the pipe, the depth of the water, the amount of tension maintained in the pipe, and other factors. Excessive bending will result in buckling or kinking of the pipe and hence a pipe discharge ramp or stinger which extends into the water behind the vessel and supports the pipe is normally used to limit the radius of curvature. Despite the precautions normally taken, however, buckling and flooding of the pipeline may occur, particularly if the vessel is caught in a sudden storm and the mooring system, tensioning equipment or stinger fails for some reason. This generally requires that the end of the pipeline be raised to the water's surface and repaired.

The recovery of an offshore pipeline after it has buckled during pipelaying operations is generally a time consuming and expensive procedure. Before the line can be raised to the surface, it is usually necessary to void the line to prevent overstressing of the pipe and avoid additional buckling. This is normally done by first having a diver cut off the damaged portion of the pipe with an underwater electric arc-oxygen cutting torch, burn holes through the pipe wall, and then install a bar or long bolt through the holes to block the end of the pipe. After the bar or bolt has been installed, a pipeline pig is inserted into the line at an accessible point onshore or at an offshore platform to which the pipeline is connected. Compressed air is then introduced into the pipeline from the shore or platform to move the pig forward and displace water from the line. After the pig has reached the blocked end of the pipe and the line has thus been voided of liquids, cables are attached to the line and the end is raised to the surface of the water. Once this has been done, the end of the pipe is cut off and a new section is welded in place to permit the resumption of pipelaying operations. Methods generally similar to these are used for the recovery of pipelines which have been damaged after being put into service.

A major disadvantage of the methods referred to above is that they require that the pipeline pig be run through the entire line from the shore installation or platform to the point at which the damage exists. This may necessitate pigging of the line over a distance of several miles and may require the use of high pressure compressors for long periods of time. It may be difficult to provide suitable compressors at the required locations. If the pipeline to be recovered is one containing oil or a similar material, the pigging operation may result in discharge of the contents of the line into the water and may cause serious pollution problems. As a result of these and related difficulties, such methods often leave much to be desired.

SUMMARY OF THE INVENTION

This invention provides an improvement in pipeline recovery methods which largely eliminates the problems referred to above. The improved method involves the introduction of air or gas into one end of a marine pipeline after the damaged portion has been cut off on bottom and the pumping of liquids from the other end of the line by means of a pump which is lowered into the pipeline through a riser on a platform to which the line is attached or is connected to the end of the line on bottom. The pumping of liquids from the pipe and the simultaneous introduction of gas is continued until a section of the pipeline at least sufficiently long to extend to the water's surface has been substantially voided of liquids. Thereafter, cables can be attached and the line can be lifted to the surface under tension without serious buckling problems. Similar procedures may be employed to permit the recovery and repair of damaged lines containing oil and other liquids.

The manner in which the method of the invention is carried out will depend in part upon the particular pipeline to be recovered. The pump used to withdraw liquids from the line will normally be installed at the lower end of the line. In the case of a line which slopes upwardly from an offshore platform or similar structure so that the end to be recovered is at a higher elevation than the base of the platform or other structure, for example, a pump will normally be lowered into the pipeline through the platform riser. An air line extending to a compressor or the atmosphere will be connected to the other end to permit the introduction of air or gas. If the sea floor slopes non-uniformly, a pigging device may be inserted into the line. The simultaneous introduction of air or gas and withdrawal of water from a section of the pipeline sufficiently long to reach the surface will permit lifting of the end of the line under tension with little danger of buckling. In the case of a pipeline which slopes downwardly from a platform or shore installation so that the end to be recovered is at a lower elevation than the rest of the line, on the other hand, an alternate technique will normally be employed. In this case, the pump will be connected to the submerged end of the line and air or gas will be admitted to the other end at the platform or shore installation. The use of a pigging device may be advantageous. Water or other liquids present in the line will then be pumped out until essentially the entire pipeline is filled with air or gas. This procedure eliminates any danger that liquids will flow into the suspended portion of the line after it is raised to the water's surface. In either case, the method permits substantial savings in recovering the end of the submerged pipeline, avoids the necessity of injecting large volumes of high pressure air or gas to displace water or other liquids present in the line, reduces the loss of oil or other materials that might cause serious pollution problems if discharged into the body of water in the conventional manner, permits recovery and repair without the necessity of having divers on bottom for long periods of time, and reduces the time required for recovery and repair operations.

The equipment employed in carrying out the method may be of conventional design and is normally available from commercial sources. Any of a variety of different electrically, hydraulically, or mechanically actuated submersible pumps that can be lowered at the end of a string of pipe or hose into a pipeline riser or connected to the submerged end of a pipeline by welding or mechanical means may be employed for pumping water from the line. Air or gas can be introduced in some cases by simply venting the line at the surface and in other cases by connecting a bull plug or similar fitting equipped with an air or gas line to the submerged end of the pipeline. Where a pigging device is to be used, an ordinary pipeline pig or an inflatable sphere of rubber or similar material may be used. In lieu of this, specially designed equipment which can be quickly attached to the end of the line and actuated from the surface to effect a closure and provide an inlet for air or gas can also be employed. Regardless of the particular equipment selected, the method of the invention has numerous advantages over pipeline recovery methods which have been employed in the past. As a result of these advantages, the method has wide application and may permit the carrying out of recovery operations that would not be feasible with methods available heretofore.

DESCRIPTION OF THE PREFERRED EMBODIMENTS

Figure 1:
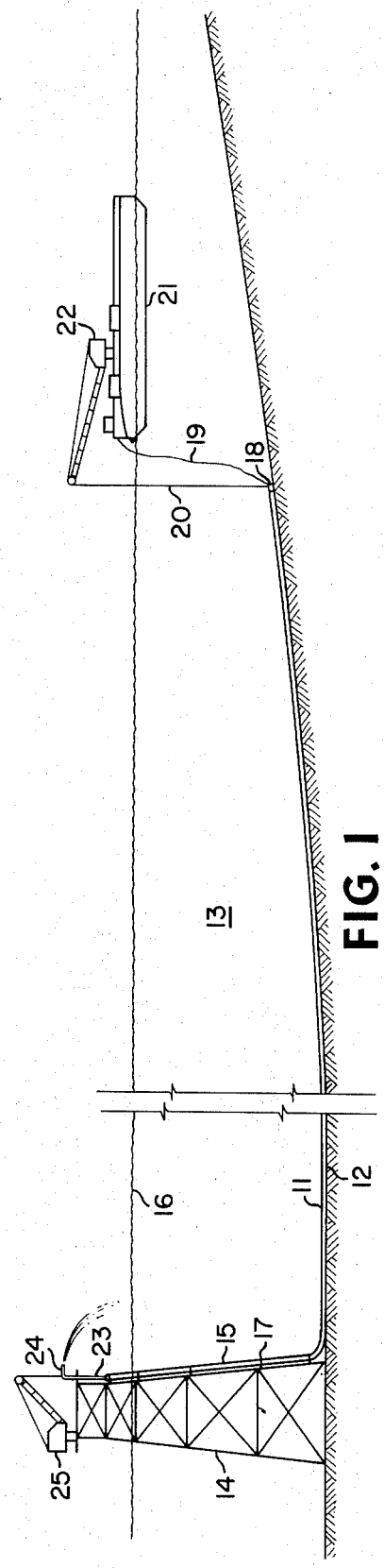
FIG. 1 in the drawing illustrates use of the method of the invention for the recovery of one end of an underwater pipeline which extends alone the ocean floor from a riser on an offshore platform.

FIG. 1 in the drawing depicts an offshore pipeline recovery operation carried out in accordance with the invention. As shown in FIG. 1, underwater pipeline 11 has been laid along the bottom 12 of a body of water 13 from an offshore platform or similar structure 14. In the particular installation shown, the end of the pipeline adjacent the platform has been connected to the lower end of a pipeline riser 15 which extends upwardly to a point above the water's surface 16 and is held in place on the platform by means of clamps or similar members 17. The type and configuration of the riser will depend upon the particular structure from which the pipeline has been laid and upon other factors. In some cases, for example, the riser may have been formed from line pipe by bending the pipe to produce a large radius curve near the base of the structure and will thus be an integral part of the pipeline; while in other cases a separate riser may be connected to the end of the pipeline and installed on the structure. In still other instances, the riser may be one of the structural members of the platform or may pass upwardly through such a structural member and may include a flexible joint designed to accomodate limited movement of the structure and riser. The method of the invention is thus applicable to any of a variety of different pipeline installations.

As illustrated in FIG. 1, the laying of pipeline 11 has been interrupted at a point several miles from platform 14. The interruption may have occured as a result of equipment malfunctioning during a severe storm which resulted in dropping, buckling and flooding of the pipe. Although not shown in the drawing, the pipeline will normally be encased in a corrosion coating and cement jacket which serve to protect the pipe and give it the required weight. These have been removed from the end of the line. The cutting off of the damaged portion and the removal of the coating and jacket can be accomplished by divers or in very deep water can be carried out with a submersible vessel fitted with manipulators. A rubber ball or similar pigging element has been inserted in the end of the pipeline and a bull plug or other closure 18 fitted with an air inlet and suitable packing has been welded or mechanically connected in place on the end of the pipe over the ball. Air line 19 and lifting cable 20 extend upwardly from the closure 18 to the laybarge or similar vessel 21 from which the recovery operation is to be carried out. The air line is secured aboard the barge and vented to the atmosphere; while the lifting cable extends from a winch or crane 22. The mooring lines employed to hold the barge in position over the end of the pipeline are not shown in the drawing.

After the closure 18 and air line 19 have been installed as described above, a pump which does not appear in the drawing is lowered into position in pipeline riser 15 by means of a string of flexible tubing, pipe, steel reinforced hose, or similar conduit 23. The pipe extends upwardly above the upper end of the riser and is fitted with a bend 24 for the discharge of liquids pumped upwardly through the tubing string. The pump and tubing are supported in the riser by means of a line from crane 25. The pump employed may be electrically, hydraulically or mechanically actuated. In cases where the riser bend precludes lowering of the pump to the bottom of the riser, a flexible tail pipe sufficiently long to extend downwardly into the pipeline itself may be attached to the bottom of the pump to serve as a liquid intake line. Following installation of the pump and pipe or tubing string, liquids are pumped upwardly through the tubing to the surface. If the liquid contained in the pipeline is sea water, the discharge will normally be disposed of over the side as shown in FIG. 1. If, on the other hand, the pipeline is one that has been damaged in service and the liquid contained therein is oil or a similar material, the effluent from the tubing string will be directed into tanks on the platform or into a barge moored nearby. As liquid is pumped out of the pipeline, atmospheric pressure exerted against the pigging element by air entering through air line 19 propels the pigging element forward through the pipeline. In a 24-inch pipeline, the total force available to move the pigging element is in excess of 6,000 pounds and hence the use of high pressure air or gas to propel the pigging element is unnecessary. This eliminates the need of a high pressure, high capacity compressor aboard barge 21. In some cases, however, it may be advantageous to both pump liquid from the line in front of the pigging element and inject compressed air or gas into the line behind the element in order to expedite the operation. If this is done, a compressor of much lower discharge pressure and capacity than would otherwise be required may be used.

Figure 2:
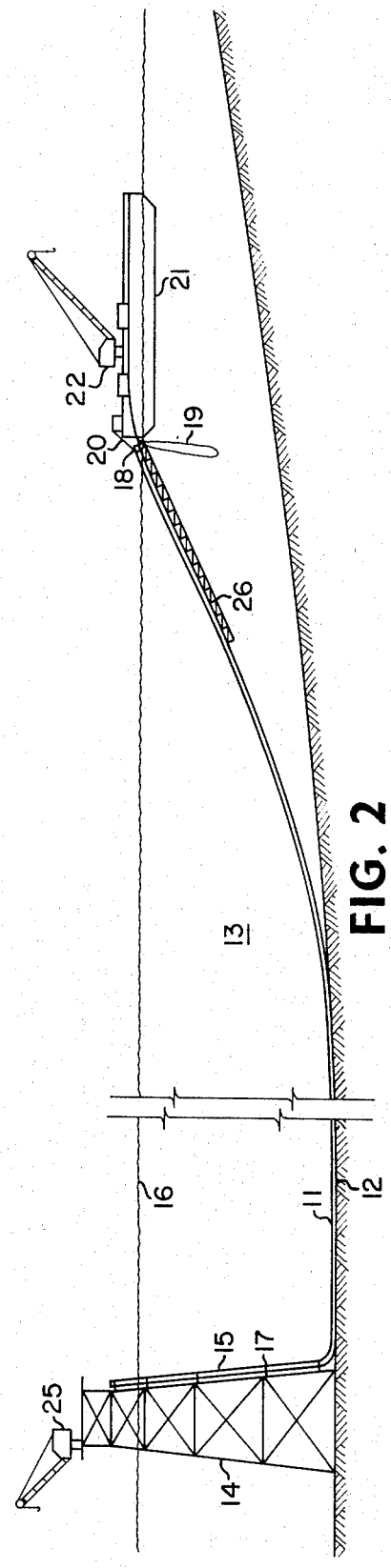
FIG. 2 depicts a later stage in the operation of FIG. 1.

The pumping of liquid from the pipeline of FIG. 1 as described above is continued until a section of the line long enough to extend to the surface of the water has been substantially voided of liquid. Since the weight of the pipe and the depth of the water are known, the length of the section from which the liquid must be removed can be readily calculated. By measuring the volume of liquid discharged from the pipeline at platform 14, the arrival of the pigging device at the necessary point in the pipeline can be determined. Thereafter, lifting cable 20 can be transferred to a winch and used to lift the end of the pipeline to the surface of the water. Sufficient tension should be maintained on the line during the lifting operations to prevent the line from buckling. The tension required, which will be much less than if the line were filled with liquid, can be readily calculated. Multiple cables spaced at intervals along the section of the line to be raised can also be used for lifting purposes. FIG. 2 in the drawing shows the pipeline after the end has been lifted to the surface of the water and transferred to a stinger 26 at the stern of laybarge 21. With the end of the line in this position, closure 18 can be removed from the end and a new length of pipe can be welded in place to permit the resumption of normal pipelaying operations.

Figure 3:
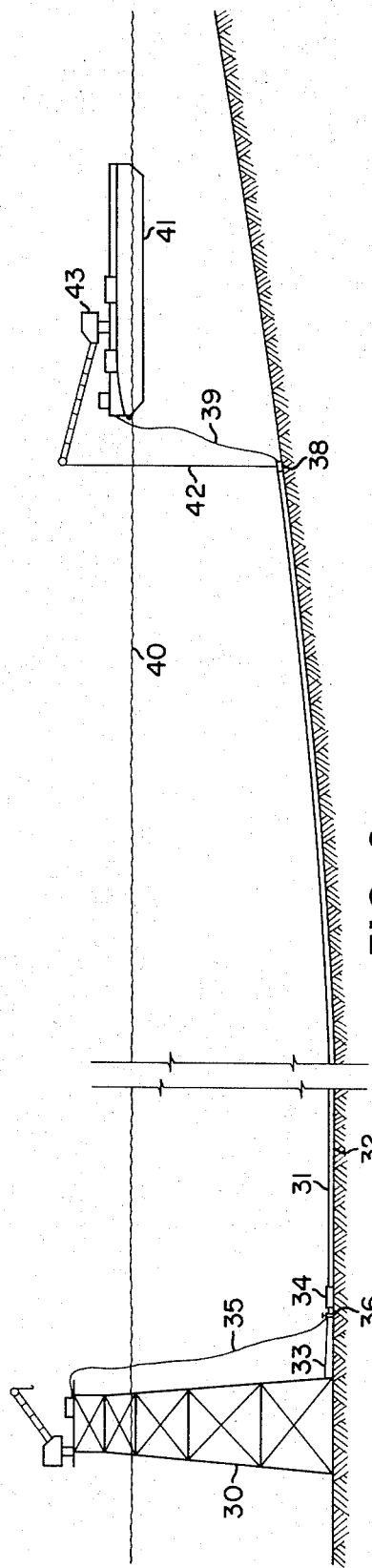
FIG. 3 shows an operation similar to that of FIGS. 1 and 2 for the recovery of one end of a pipeline which has not yet been connected to a riser on an offshore platform.

FIG. 3 in the drawing illustrates an operation which is similar to that described in connection with FIGS. 1 and 2 but differs in that the pipeline has not yet been connected in place to a riser at offshore structure 30. As indicated in the drawing, the end of the pipeline 31 has been secured in place on the ocean floor 32 by means of a cable 33 extending to the base of the platform. A submersible pump 34 powered by an electrical cable or hydraulic line 35 extending upwardly to the deck of the platform has been connected to the end of the pipe. A check valve 36 or a hydraulically actuated valve powered by means of a hydraulic line extending to the surface may be connected to the discharge side of the pump if necessary to prevent the backflow of water into the pipeline when the pump is not in operation. Depending upon the particular type of pump employed, such a valve may or may not be needed.

The recovery of the other end of pipeline 31 in FIG. 3 of the drawing is carried out in much the same manner as was the recovery of pipeline 11 in FIGS. 1 and 2. As illustrated in FIG. 3, a bull plug or similar closure 38 fitted with an air inlet has been attached to the end of the line. Air line 39 extends upwardly to the surface of the water 40 and is secured aboard laybarge or similar vessel 41. Hoisting cable 42 is connected to the end of the line and to crane 43 aboard the barge. The pigging device inserted in the end of the line prior to installation of the bull plug or similar closure does not appear in the drawing. After the required volume of water has been pumped from the pipeline and the pigging device has moved through a section of the pipeline at least as long as the length required to reach the water's surface, pump 34 is shut down and valve 36 is closed if necessary to prevent backflow into the line. The voided line can then be picked up by means of the hoisting cable and pipelaying operations can thereafter be resumed. The pump at the other end of the line can be recovered when the riser is installed and the pipeline is connected into place.

It will be noted that in the operations shown in FIGS. 1, 2 and 3 of the drawing the ocean floor slopes upwardly from the offshore platform so that the end of the pipeline to be recovered is at a higher level than the end adjacent the platform. Under these circumstances, it is not necessary to dewater the entire pipeline. All that is required is that sufficient water be withdrawn to prevent liquid from filling the suspended portion of the line when the closure is removed from the end aboard the laybarge. In some cases, however, the bottom contour may be such that removal of the closure is apt to result in backflow into the suspended portion of the line. In such cases, it may sometimes be desirable to pump as much liquid as possible from the line and simultaneously inject high pressure air or gas from a source aboard the laybarge or similar vessel until the pigging device has traversed the entire line and substantially all of the liquids have been displaced. This displacement of liquids by both pumping out the line in front of the pigging device and injecting gas under pressure behind the device normally permits significant savings over the use of high pressure air or gas alone.

Figure 4:
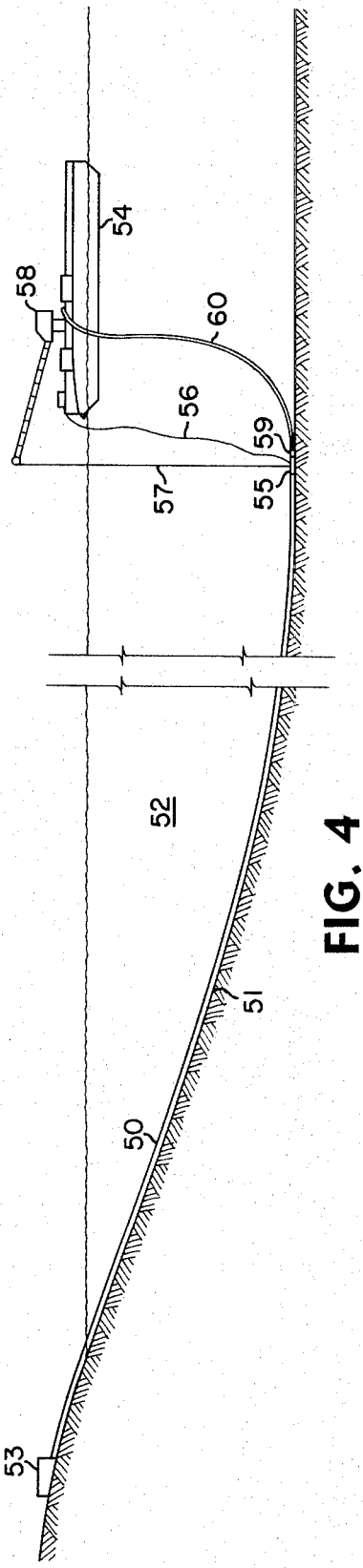
FIG. 4 illustrates use of the method for the recovery of a pipeline laid into deep water from an onshore installation.

FIG. 4 in the drawing illustrates an alternate procedure which may be employed where backflow into the suspended portion of the pipeline might otherwise present difficulties. As shown in FIG. 4, pipeline 50 has been laid along the bottom 51 of a body of water 52 from onshore installation 53. The pipelaying operation has been interrupted in deep water because of equipment malfunctioning during a storm or other events which resulted in dropping, buckling and flooding of the line. The pipe will again normally be provided with a corrosion coating and a cement jacket for weighting purposes and may be buried in part. The damaged portion of the line has been cut off on bottom by a diver using an electric arc-oxygen torch or similar equipment. It may be lifted to the surface and taken aboard laybarge 54 if desired. An electrically or hydraulically actuated pump 55 powered by means of line 56 has been lowered into place on cable 57 from crane 58 and connected to the end of the line. This may be done by the diver or, in very deep water, a submersible vessel fitted with manipulators may be used for both cutting off the end of the pipe and welding or mechanically connecting the pump in place. A check valve 59 designed to prevent backflow will normally be attached to the discharge side of the pump but in some cases the use of such a valve may not be necessary. If desired, a hose or string of flexible tubing 60 may be connected to the outlet of the check valve or discharge side of the pump to conduct the discharged liquids to the surface. This is not normally necessary where the pipeline contains only water.

Following connection of the pump to the end of the pipeline on bottom as described above, the other end onshore is vented to the atmosphere or, if the pipeline contains oil, connected to a low pressure source of natural gas or other gas which will not support combustion. A pigging device may be inserted in the open end of the line if desired but this is usually unnecessary. The pumping of water from the line is then commenced. After essentially all of the water has been pumped out and the line has filled with air, as indicated by the change in load on the pump or by means of a signal actuated by arrival of the pigging device at the pump, pumping can be terminated. The air- or gas-filled line can now be lifted to the surface for repair without serious danger of buckling or related problems. Since the entire line is essentially free of liquids, no backflow will occur on removal of the pump and check valve at the surface.

The method illustrated in FIG. 4 can also be used for the recovery of damaged lines containing oil or other liquids that cannot be discharged from the pump into the surrounding body of water. In an operation of this later type, reinforced hose, a string of flexible tubing, or a similar conduit 60 will be connected to the check valve on the end of the pump so that the liquid can be conducted to the surface and discharged into tanks aboard the laybarge or an auxiliary barge moored nearby. After the pipeline has been substantially voided of liquids, the flexible hose or tubing can be raised to the surface as the end of the pipeline is lifted. This minimizes pollution of the water and permits recovery of the contents of the line for later sale or reuse.

It will be apparent from the foregoing that the invention provides an effective and relatively inexpensive method for the recovery of pipelines which can be used regardless of the contour of the bottom and the position of one end of the line with respect to the other. The pumping of liquids from one end of the line while admitting air or gas at the other as described above permits substantial savings in pipeline recovery operations, minimizes the loss of oil or other liquids contained in lines damaged after they have been placed in service, avoids the necessity for using large volumes of high pressure gas during recovery operations, and has other advantages over recovery methods proposed in the past.

I claim:

1. A method for recovering a submerged end of a liquid-filled pipeline from the bottom of a body of water which comprises introducing a gas into one end of said pipeline and pumping liquid from the other end of said pipeline until liquid has been voided from a section of said pipeline adjacent said submerged end sufficiently long to reach at least to the surface of said body of water and thereafter lifting said submerged end to the water's surface.

2. A method as defined by claim 1 wherein said gas is introduced by venting said pipeline to the atmosphere.

3. A method as defined by claim 1 wherein said gas is introduced at a pressure in excess of atmospheric pressure.

4. A method as defined by claim 1 wherein said liquid is pumped from said pipeline by means of a pump lowered into said pipeline through a pipeline riser.

5. A method as defined by claim 1 wherein said liquid is withdrawn by means of a pump connected to an end of said pipeline on bottom.

6. A method as defined by claim 1 wherein the introduction of said gas and the pumping out of said liquid are continued until said pipeline has been substantially voided of liquid.

7. A method as defined by claim 1 wherein said gas is air and said liquid is water.

8. A method as defined by claim 1 wherein a pipeline pigging device is inserted into said pipeline prior to the introduction of said gas and the pumping out of said liquid.

9. A method for recovering a submerged end of a liquid-filled pipeline which slopes upwardly to said submerged end from an offshore structure which comprises inserting a pigging device in said submerged end of said pipeline, introducing a gas into said submerged end and pumping liquid from the other end of said pipeline until said pigging device has traversed a section of said pipeline sufficiently long to extend at least to the water's surface, and thereafter lifting said submerged end of said pipeline to the surface of the water.

10. A method as defined by claim 9 wherein said liquid is pumped from said other end of said pipeline by lowering a submersible pump into a pipeline riser to which said other end is connected and thereafter actuating said pump.

11. A method as defined by claim 10 wherein said submersible pump is lowered in said riser near the end of a conduit and liquid is pumped through said conduit to the water's surface.

12. A method as defined by claim 9 wherein said liquid is pumped from said other end of said pipeline by connecting a submersible pump to said other end on bottom and thereafter actuating said pump.

13. A method for recovering a submerged end of a liquid-filled pipeline which slopes downwardly along the bottom of a body of water to said submerged end which comprises connecting a submersible pump to said submerged end of said pipeline, pumping liquid from said submerged end of the pipeline and simultaneously introducing gas into the other end of the pipeline until said pipeline has been substantially voided of liquids, and thereafter lifting said submerged end of said pipeline to the water's surface.

14. A method as defined by claim 13 wherein said gas is introduced into said other end of said pipeline by venting said other end to the atmosphere.

15. A method as defined by claim 13 wherein said gas is introduced into said other end of said pipeline at a pressure in excess of atmospheric pressure.

16. A method as defined by claim 13 wherein said liquid is oil and said oil is pumped from said submerged end of the pipeline through a conduit extending to the water's surface.

17. A method as defined by claim 13 wherein said liquid is oil and said gas is one which does not support combustion.

18. A method as defined by claim 13 wherein a pigging device is inserted in said other end of said pipeline prior to the introduction of said gas in said other end.

19. A method for recovering an end of a flooded pipeline from the bottom of a body of water on which one end of the pipeline is at a higher elevation than the other end of the pipeline which comprises pumping water from the end of said pipeline which is at the lower elevation, simultaneously introducing gas into the end of the pipeline which is at the higher elevation, continuing the pumping out of said water and the introduction of said gas until a section at one end of said pipeline sufficiently long to extend at least to the water's surface has been filled with gas, and thereafter lifting the end of said pipeline adjacent said section filled with gas to the surface of said body of water.

20. A method as defined by claim 19 wherein the pumping of water from said end of said pipeline at the lower elevation and the introduction of gas into said end of said pipeline at the higher elevation are continued until said pipeline has been substantially voided of water and said end of said pipeline at said lower elevation is thereafter lifted to the surface of said body of water.

* * * * *

UNITED STATES PATENT OFFICE
CERTIFICATE OF CORRECTION

Patent No. 3,777,499     Dated December 11, 1973

Inventor(s) Jamie F. Matthews, Jr.

It is certified that error appears in the above-identified patent and that said Letters Patent are hereby corrected as shown below:

Column 7, line 51, delete "withdrawn" and insert --pumped from said pipeline--.

Signed and sealed this 16th day of April 1974.

(SEAL)
Attest:

EDWARD M. FLETCHER, JR.
Attesting Officer

C. MARSHALL DANN
Commissioner of Patents